United States Patent
Doré et al.

(10) Patent No.: US 10,153,120 B1
(45) Date of Patent: Dec. 11, 2018

(54) BYPASS SWITCH COMPRISING A MOVABLE MEMBER WITH A FIRST CONDUCTIVE SECTION AND A SECOND CONDUCTIVE SECTION

(71) Applicant: ABB SCHWEIZ AG, Baden (CH)

(72) Inventors: Erik Doré, Ludvika (SE); Henrik Breder, Västerås (SE); Ola Jeppsson, Västerås (SE)

(73) Assignee: ABB SCHWEIZ AG, Baden (CH)

( * ) Notice: Subject to any disclaimer, the term of this patent is extended or adjusted under 35 U.S.C. 154(b) by 0 days.

(21) Appl. No.: 15/559,648

(22) PCT Filed: Apr. 24, 2015

(86) PCT No.: PCT/EP2015/058896
§ 371 (c)(1),
(2) Date: Sep. 19, 2017

(87) PCT Pub. No.: WO2016/169612
PCT Pub. Date: Oct. 27, 2016

(51) Int. Cl.
*H01H 1/20* (2006.01)
*H01H 39/00* (2006.01)
(Continued)

(52) U.S. Cl.
CPC ............ *H01H 71/10* (2013.01); *H01H 39/00* (2013.01); *H01H 71/08* (2013.01); *H02H 1/0007* (2013.01); *H01H 2235/01* (2013.01)

(58) Field of Classification Search
CPC ........ H01H 71/10; H01H 39/00; H01H 71/08; H01H 2235/01; H01H 31/24; H01H 1/20;
(Continued)

(56) References Cited

U.S. PATENT DOCUMENTS 3,155,790 A * 11/1964 Lemonnier ............... H01H 1/06
200/243
3,864,652 A * 2/1975 Zubaty ................. H01H 1/2066
200/248
(Continued)

FOREIGN PATENT DOCUMENTS

DE 23 46 928 A1 7/1975
DE 102 06 509 A1 8/2003
(Continued)

OTHER PUBLICATIONS

International Preliminary Report on Patentability, issued in PCT/EP2015/058896, dated Apr. 3, 2017.
(Continued)

*Primary Examiner* — Thienvu Tran
*Assistant Examiner* — Nicolas Bellido
(74) *Attorney, Agent, or Firm* — Birch, Stewart, Kolasch & Birch, LLP

(57) ABSTRACT

A bypass switch provides a bypass path between a first terminal and a second terminal. The bypass switch includes: a first set of electrical contacts respectively connected to the first terminal and the second terminal; a second set of electrical contacts respectively connected to the first terminal and the second terminal; and a movable member. The movable member includes a first conductive section, a second conductive section and an insulator between the first conductive section and the second conductive section, wherein the movable member is movable from an initial state, via a first state, to a second state, wherein in the initial state the first set of electrical contacts are conductively separated and the second set of electrical contacts are conductively separated, in the first state the first set of electrical contacts are conductively connected via the first conductive section and the second set of electrical contacts are conductively separated, and in the second state the (Continued)

second set of electrical contacts are conductively connected via the second conductive section.

20 Claims, 2 Drawing Sheets

(51) Int. Cl.
*H01H 71/10* (2006.01)
*H02H 1/00* (2006.01)
*H01H 71/08* (2006.01)

(58) Field of Classification Search
CPC .... H01H 50/546; H01H 33/01; H02H 1/0007; H02H 3/20; H02H 3/207; H02H 3/24
USPC .......................................................... 361/90
See application file for complete search history.

(56) References Cited

U.S. PATENT DOCUMENTS

| | | | | |
|---|---|---|---|---|
| 9,099,268 | B2* | 8/2015 | Oberg | H01H 39/004 |
| 9,800,046 | B2* | 10/2017 | Dore | H02M 7/003 |
| 2005/0219020 | A1* | 10/2005 | Wabner | H01H 1/2016 |
| | | | | 335/132 |
| 2009/0127230 | A1* | 5/2009 | Schmitz | H01H 9/40 |
| | | | | 218/145 |
| 2015/0108091 | A1* | 4/2015 | Oberg | H01H 39/004 |
| | | | | 218/65 |
| 2015/0371796 | A1* | 12/2015 | Cernat | H01H 33/123 |
| | | | | 218/146 |

FOREIGN PATENT DOCUMENTS

| | | | |
|---|---|---|---|
| DE | 10 2013 200 918 A1 | 7/2014 | |
| EP | 2 555 217 A1 | 2/2013 | |
| EP | 2 775 502 A1 | 9/2014 | |
| EP | 2775502 A1 * | 9/2014 | ............. H01H 47/32 |
| GB | 1 576 877 | 10/1980 | |
| WO | WO 96/19816 A1 | 6/1996 | |

OTHER PUBLICATIONS

International Search Report, issued in PCT/EP2015/058896, dated Dec. 22, 2015.
Written Opinion of the International Searching Authority, issued in PCT/EP2015/058896, dated Dec. 22, 2015.

* cited by examiner

BYPASS SWITCH COMPRISING A MOVABLE MEMBER WITH A FIRST CONDUCTIVE SECTION AND A SECOND CONDUCTIVE SECTION

TECHNICAL FIELD

The invention relates to a bypass switch, a power system and a method for providing a conductive path between a first terminal and a second terminal.

BACKGROUND

Power systems such as electrical power distribution or transmission systems are used for supplying, transmitting and using electric power. High Voltage Direct Current (HVDC) power transmission becoming more prevalent due to increasing need for power transmission with low transmission loss and flexible interconnection possibilities.

Power systems such as electrical power transmission systems generally include a protection system for protecting, monitoring and controlling the operation of electrical devices in the power system. Such protection systems may for example be able to detect short circuits, overcurrents and overvoltages in power lines, transformers and/or other parts or components of the power system. The protection systems can include protection equipment such as circuit breakers for isolating any possible faults for example occurring in power transmission and distribution lines by opening or tripping the circuit breakers. After the fault has been cleared, e.g. by performing repairs and/or maintenance on the component in which the fault has been detected, the power flow can be restored by closing the circuit breakers.

Moreover the protection system can be arranged to, upon detection of a fault in a particular electrical device, isolate the faulty electrical device by bypassing the electrical device, using a bypass switch. The bypass switch then provides a conductive path to bypass the electrical device until the electrical device is repaired or replaced.

An HVDC converter station converts high voltage direct current (DC) to alternating current (AC) or vice versa. An HVDC converter station may comprise a plurality of elements such as a converter device (or a plurality of converters devices connected in series or in parallel), an AC switchgear, transformers, capacitors, filters, a DC switchgear and/or other auxiliary elements. Converter devices may comprise a plurality of solid-state based devices such as semiconductor devices and may be categorized as line-commutated converters, using e.g. thyristors as switches, or voltage source converters, using transistors such as insulated gate bipolar transistors (IGBTs) as switches. A plurality of solid-state semiconductor devices such as thyristors or IGBTs may be connected together, for instance in series, to form a building block, or cell, of an HVDC converter, which may also be referred to as an HVDC converter valve.

According to one example, a plurality of solid-state semiconductor devices such as thyristors or IGBTs may be connected in series in a cell of an HVDC converter. During normal operation of e.g. an HVDC power transmission system or an HVDC grid including the HVDC converter, the solid-state semiconductor devices in the HVDC converter may at times be in a conducting mode in which they are conducting current and at other times be in a blocking mode, in order to attain a desired (e.g. sinusoidal) waveform of the current. This may expose the solid-state semiconductor devices to continuous current stresses, which, especially in HVDC applications, may be of significant magnitude. If any one of the solid-state semiconductor devices fails, the current through the HVDC converter can be interrupted, and repairs and/or replacement of any failed solid-state semiconductor device might then become necessary in order to put the HVDC converter back into operation. In an HVDC converter station based on voltage source converters there may be DC capacitors, or DC capacitor banks, which act as voltage sources and which are connected to, for instance in parallel, one or several solid-state semiconductor devices such as IGBTs included in a cell of an HVDC converter.

As described above, upon detection of a fault in a particular electrical device, the faulty electrical device can be isolated by bypassing the electrical device, using a bypass switch. Such fault operation can be applied for faulty semiconductors and/or capacitor banks. However, due to the high voltages involved, arcing occurs during the switching, which deteriorates the contacts of the bypass switch, resulting in losses and/or an unstable bypass state.

EP2775502 presents a device having an auxiliary switch contact bridge and a protective contact bridge that are deflected in a first position such that the auxiliary switch contact bridge is electrically connected with an auxiliary switch fixed contact, and are deflected in a second position such that protective contact bridge is electrically connected with contactor fixed contact. A control device is set to turn on a contactor for preset time period. A coil is energized with current for switching on the contactor such that a switch occupies the first or second position.

It is desired to provide a bypass switch which reduces the ill-effects due to arcing.

SUMMARY

According to a first aspect, it is presented a bypass switch for providing a bypass path between a first terminal and a second terminal. The bypass switch comprises: a first set of electrical contacts respectively connected to the first terminal and the second terminal; a second set of electrical contacts respectively connected to the first terminal and the second terminal; and a movable member comprising a first conductive section, a second conductive section and an insulator between the first conductive section and the second conductive section, wherein the movable member is movable from an initial state, via a first state, to a second state, wherein in the initial state the first set of electrical contacts are conductively separated and the second set of electrical contacts are conductively separated, in the first state the first set of electrical contacts are conductively connected via the first conductive section and the second set of electrical contacts are conductively separated, and in the second state the second set of electrical contacts are conductively connected via the second conductive section.

The movable member may be displaceable along a first direction to transition from the initial state, via the first state, to the second state.

The second conductive section may be located, in the first direction, in front of the first conductive section.

The bypass switch may further comprise a pyrotechnic device which, when fired, produces a shock wave to move the movable member from the initial state, via the first state to the second state.

The bypass switch may further comprise a spring which, when released causes the movable member to move from the initial state, via the first state to the second state.

In the second state, the second conductive section may be wedged between the second set of electrical contacts.

During transition from the initial state via the first state to the second state, the movement of the movable member may be sufficiently slow such that energy transferred between the first set of electrical contacts during the first state prevents arcing from either of the second set of electrical contacts when the second state is assumed.

The bypass switch may further comprise a reactor between one of electrical contacts of the second set of electrical contacts and one of the first electrical contact and the second electrical contact.

The first conductive section may be detachably connected to the second conductive section.

According to a second aspect, it is presented a power system comprising: an electrical device; and the bypass switch according to any one of the preceding claims; wherein the first terminal and the second terminal of the bypass switch, are connected across the electrical device.

According to a third aspect, it is presented a method for providing a conductive path between a first terminal and a second terminal, the method being performed in a bypass switch comprising a first set of electrical contacts respectively connected to the first terminal and the second terminal; a second set of electrical contacts respectively connected to the first terminal and the second terminal; and a movable member comprising a first conductive section, a second conductive section and an insulator between the first conductive section and the second conductive section. The method comprises the steps of: moving the moveable member is from an initial state to a first state wherein in the initial state the first set of electrical contacts are conductively separated and the second set of electrical contacts are conductively separated, and in the first state the first set of electrical contacts are conductively connected via the first conductive section and the second set of electrical contacts are conductively separated, and moving the moveable member from the first state to a second state, wherein in the second state the second set of electrical contacts are conductively connected via the second conductive section.

The method may further comprise the step of: detecting a fault in an electrical device connected across the first terminal and the second terminal.

The steps of moving from the initial state to the first state and moving from the first state to the second state may be performed as a result of a continuous movement of the moveable member.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1A:
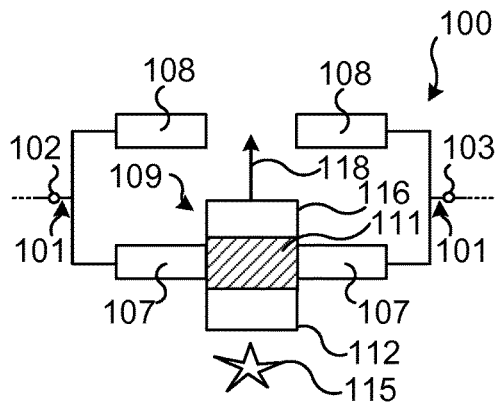
FIGS. 1A-C are schematic diagrams illustrating various states of a bypass switch according to one embodiment.
Figure 1B:
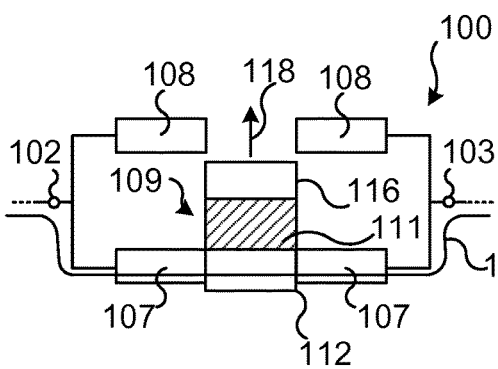
Figure 1C:
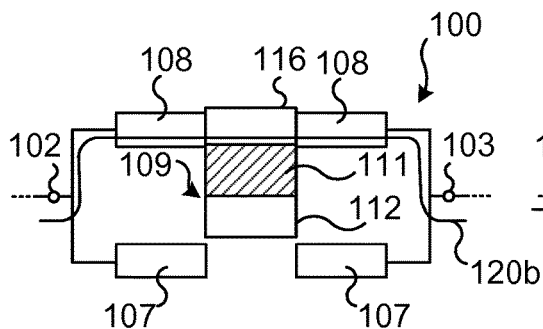

FIGS. 1A-C are schematic diagrams illustrating various states of a bypass switch 100 according to one embodiment. FIG. 1A illustrates an initial state, FIG. 1B illustrates a first state and FIG. 1C illustrates a second state of the bypass switch.

The bypass switch 100 is used for providing a bypass path between a first terminal 102 and a second terminal 103. The bypass path is a conductive path allowing an electrical current to flow between the first terminal 102 and the second terminal 103, either unidirectionally in either direction or bidirectionally.

A first set of electrical contacts 107 are respectively connected to the first terminal 102 and the second terminal 103. Analogously, a second set of electrical contacts 108 are respectively connected to the first terminal 102 and the second terminal 103.

A movable member 109 comprises a first conductive section 112 and a second conductive section 116. An insulator 111 is provided between the first conductive section 112 and the second conductive section 116. The moveable member 109 is displaceable along a first direction 118 and can be guided in such a movement by surrounding structure (not shown). The resulting movement is a translational movement.

The movable member 109 is movable from an initial state shown in FIG. 1A, via a first state shown in FIG. 1B, to a second state shown in FIG. 1C.

In the initial state shown in FIG. 1A, the first set of electrical contacts 107 are conductively separated and the second set of electrical contacts 108 are conductively separated. Hence, in this state, there is no conductive path between the first terminal 102 and the second terminal 103, corresponding to a normal operational state where a protected electrical device is not bypassed. In the state shown here, the insulator 111 is located between the first set of electrical contacts, thus providing conductive separation between the first set of electrical contacts 107. This allows the movable member 109 to be positioned such that the second section 116 is ahead of the first set of electrical contacts (along the first direction 118). Consequently, if the first section 112 would get stuck between the first set of electrical contacts 107, the second conductive section 116 can continue movement towards the second set of electrical contacts 108, as long as this is separable from the first conductive section 112. Furthermore, there is a physical separation in which air (or other fluid) is provided between the first set of electrical contacts, to attain the conductive separation.

An actuator, here in the form of a pyrotechnic device 115, is triggered when the bypass device is to be activated. The actuator is thus used when the movable member 109 is to be moved to thereby achieve a conductive path through the bypass device. The actuator can be any suitable device which can be controlled to move the movable member 109 along the first direction 118. For instance, the actuator could also be implemented using a spring, etc.

In the first state shown in FIG. 1B, the movable member 109 has moved so far that the first set of electrical contacts 107 are conductively connected via the first conductive section 112. The transition from the initial state to the first state occurs when the first set of electrical contacts become conductively connected. In this way, a first conductive path 120a is provided between the first terminal 102 and the second terminal 103. In the first state, the second set of electrical contacts 108 are conductively separated, whereby the initial energy transfer, which may involve arcing, between the first terminal and the second terminal 103 only occurs using the first set of electrical contacts 107.

However, the movable member 109 continues to move due to its kinetic energy provided by the actuator. Once the moveable member 109 has moved so far that the second conductive section 116 causes a conductive connection between the second set of electrical contacts 108, the second state is assumed, as shown in FIG. 1C. In the second state, a second conductive path 120b is provided between the first terminal 102 and the second terminal 103 via the second set of electrical contacts 108. During the movement of the movable member 109, there may be a transitional state between the first state and the second state. During the transitional state, there is optionally no conductive connection between the first terminal 102 and the second terminal 103. Alternatively, the first conductive section 112 is temporarily or indefinitely connected to the first set of electrical contacts 107 also when the second conductive section 116 provides the conductive connection between the second set of electrical contacts 108. In other words, in the second state, there is optionally still a conductive connection between the first set of electrical contacts 107.

The first state allows the first set of electrical contacts 107 to take the main electrical stress when the bypass switch is triggered and is used to reduce the voltage between the two sides of the bypass switch, which may involve arcing. Arcing often reduces the quality of the contacts, but since the bypass switch then proceeds to the second state, the arcing is already done and the second set of electrical contacts 108 are connected without (or negligible) arcing. The second set of electrical contacts are then connected without (or with negligible) arcing, providing a stable and predictable connection which can last indefinitely e.g. until the bypassed electrical device is replaced.

Since the moveable member 109 comprises both the first conductive section 112 and the second conductive section 116, the same propellant force is used to close both the first (arcing) conductive path 120a and the second (stable) conductive path 120b, which results in a bypass switch with only one trigger to the actuator and with a low number of components and which still achieves an arcing contact followed by a stable contact.

In this embodiment, the second conductive section 116 is located, with reference to the first direction, in front of the first conductive section 112. Moreover, the first conductive section 112 is detachably connected to the second conductive section 116. In this way, if the first conductive section 112 becomes stuck between the first set of electrical contacts 107 due to material surface changes due to arcing, the second conductive section 116 can continue movement in the first direction 118, detaching from the first conductive section 112. The detachable connection can be any mechanical connection which can be released due to the kinetic energy of the first conductive section (and optionally the insulator 111) when the first conductive section 112 becomes stuck.

The dimensions of the contacts and the timing of the movement (e.g. speed when propelled by the actuator) can be configured such that sufficient energy is transferred between the two sides of the bypass switch in the first state. In other words, during transition from the initial state via the first state to the second state, the movement of the movable member 109 is sufficiently slow such that energy transferred between the first set of electrical contacts 107 during the first state prevents arcing from either of the second set of electrical contacts 108 when the second state is assumed.

It is to be noted that the FIGS. 1A-C are only schematic to better explain the functionality of the bypass switch and the geometrical structure of the components shown can vary significantly from what is shown. For instance, the electrical contacts 107, 108 can be implemented using wedging, sliding, collector rails, tulip contacts etc.

The bypass switch can be for one time use, requiring replacement after use. Alternatively, the bypass switch can be deployed multiple times, by allowing the moveable member to be moved back to the initial state and replacing or preparing the actuator for another trigger.

Figure 2A:
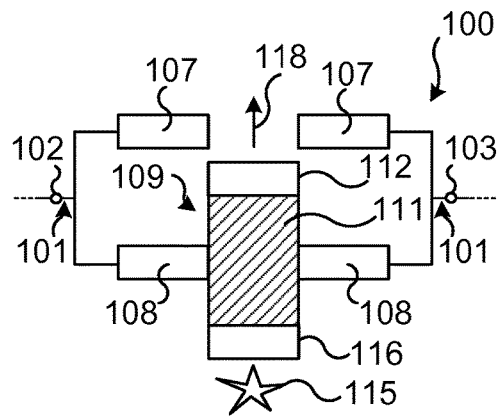
FIGS. 2A-C are schematic diagrams illustrating various states of a bypass switch according to one embodiment.
Figure 2B:
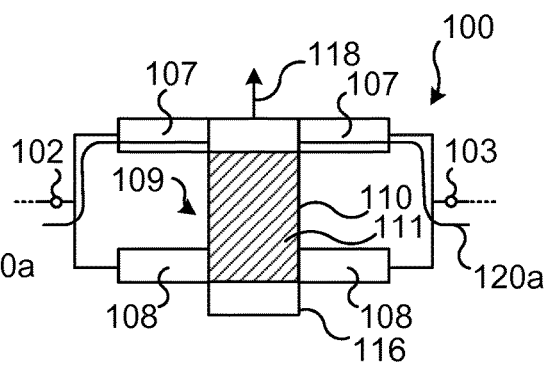
Figure 2C:
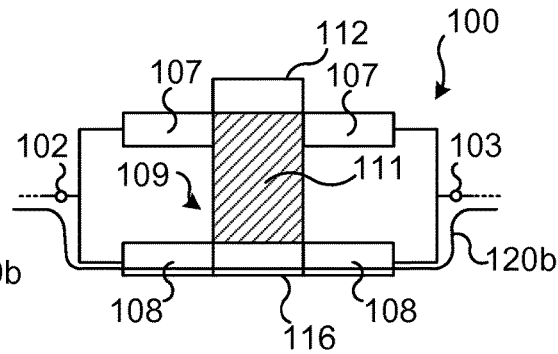

FIGS. 2A-C are schematic diagrams illustrating various states of a bypass switch according to one embodiment. FIG. 2A illustrates the initial state, FIG. 2B illustrates the first state and FIG. 2C illustrates the second state of the bypass switch. The structure and operation of this embodiment corresponds to the embodiment of FIGS. 1A-C, and only differences are pointed out here.

In this embodiment, the second conductive section 116 is located, in the first direction 118, behind of the first conductive section 112. This also implies that the first electrical contacts 107 are located in front of the second electrical contacts 108 (in the first direction).

Figure 3:
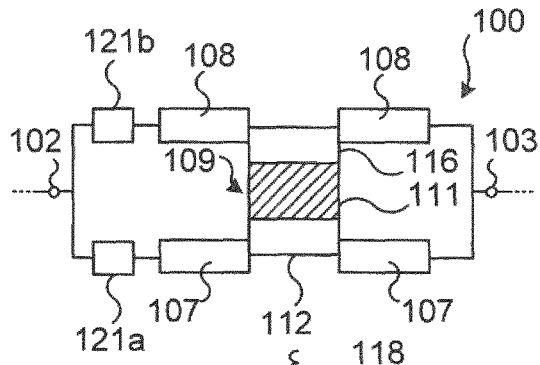
FIG. 3 is a schematic diagram illustrating the embodiment of FIGS. 1A-C with the use of varying impedances.

FIG. 3 is a schematic diagram illustrating the embodiment of FIGS. 1A-C with the use of varying impedances. Here, there is a first impedance 121a between one of electrical contacts of the first set of electrical contacts 107 and one of the electrical contacts 102, 103. There is further a second impedance 121b between one of electrical contacts of the second set of electrical contacts 108 and one of the electrical contacts 102, 103.

In this embodiment, the reactance of the second impedance 121b is significantly higher than the reactance of the first impedance. Significantly higher can e.g. be at least double. In one embodiment, the first impedance 121a is no physical component but only represents the (mainly resistive) impedance of the conductors of the bypass switch. In one embodiment, the second impedance 121b is a reactor.

Due to the higher reactance of the second impedance 121b compared to the first impedance 121a, in a situation (e.g. in a transitional state between the first state and the second state) where both the first set of electrical contacts 107 and the second set of electrical contacts 108 are conductively connected, the increase in current over the second set of electrical contacts 108 is relatively slow. In this way, more energy is transferred over the first set of electrical contacts. In this way, by dimensioning the first and second impedances 121*a*, 121*b* appropriately, the energy transfer can be controlled to first occur over the first set of electrical contacts 107 to thus take care of the arcing.

It is to be noted that here, the actuator is illustrated as a spring 118.

Figure 4:
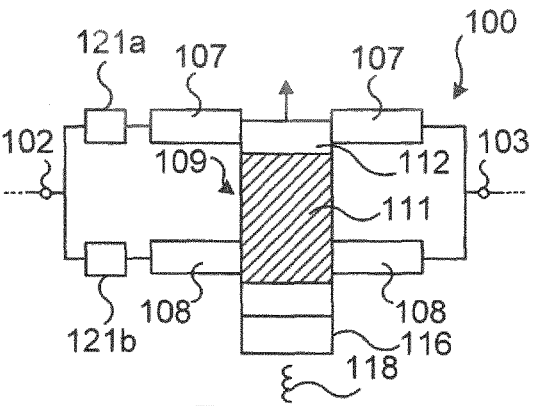
FIG. 4 is a schematic diagram illustrating the embodiment of FIGS. 2A-C with the use of varying impedances.

FIG. 4 is a schematic diagram illustrating the embodiment of FIGS. 2A-C with the use of varying impedances. As with the embodiment of FIG. 3, there is a first impedance 121*a* between one of electrical contacts of the first set of electrical contacts 107 and one of the electrical contacts 102, 103. There is further a second impedance 121*b* between one of electrical contacts of the second set of electrical contacts 108 and one of the electrical contacts 102, 103. Also here, the second impedance 121*b* has a significantly higher reactance than the first impedance 121*a*, to allow the operation explained above with reference to FIG. 3.

Figure 5:
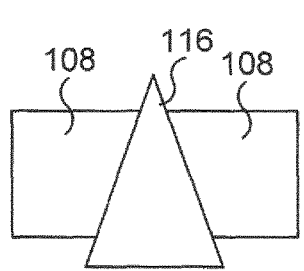
FIG. 5 is a schematic diagram illustrating how the second conductive section of the embodiment of FIGS. 1A-C can be wedged between a set of electrical contacts.

FIG. 5 is a schematic diagram illustrating how the second conductive section 116 of the embodiment of FIGS. 1A-C can be wedged between the second set of electrical contacts 108. The wedging is achieved due to the structure of the second conductive section 116 and the second electrical contacts 108 when the moveable member comprising the second conductive section 116 moves forward along the first direction. The wedging provides a stable and reliable contact between the second set of electrical contacts 108.

Figure 6:
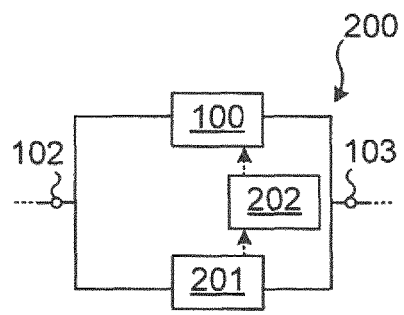
FIG. 6 is a schematic diagram illustrating a power system employing a bypass switch.

FIG. 6 is a schematic diagram illustrating a power system 200 employing a bypass switch 100. The power system 200 comprises an electrical device 201 and a bypass switch 100 according to any of the embodiments described above. The first terminal 102 and the second terminal 103 of the bypass switch are connected across the electrical device 201. The electrical device 201 is any suitable type of electrical device which can benefit from bypassing when it fails, e.g. capacitors, solid state switches, etc.

A controller 202 is provided which, when a fault 201 is detected in the electrical device 201, sends a signal to the bypass switch 100 to provide a bypass path. The signal actuates the actuator of the bypass switch to thereby trigger a movement of the moveable member as described above.

Figure 7:
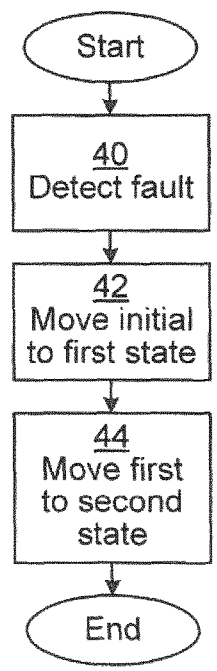
FIG. 7 is a flow chart illustrating a method for providing a conductive path in a bypass switch.

FIG. 7 is a flow chart illustrating a method for providing a conductive path in an embodiment of the bypass switch. The method is performed in the bypass switch.

In a detect fault step, a fault is detected in an electrical device connected across the first terminal 102 and the second terminal 103. This causes the actuator of the bypass switch to be triggered.

In a move initial to first state step 42, the moveable member 109 is moved from the initial state to the first state. As described above, in the initial state the first set of electrical contacts 107 are conductively separated and the second set of electrical contacts 108 are conductively separated. Moreover, in the first state the first set of electrical contacts 107 are conductively connected via the first conductive section 112 and the second set of electrical contacts 108 are conductively separated.

In a move first to second state step 44, the moveable member 109 is moved from the first state to a second state. As described above, in the second state the second set of electrical contacts 108 are conductively connected via the second conductive section 116.

The move initial to first state step 42 and the move first to second state step 44 may be performed as a result of a continuous movement of the moveable member.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A bypass switch for providing a bypass path between a first terminal and a second terminal, the bypass switch comprising:
 a first set of electrical contacts respectively connected to the first terminal and the second terminal;
 a second set of electrical contacts respectively connected to the first terminal and the second terminal;
 a movable member comprising a first conductive section, a second conductive section and an insulator between the first conductive section and the second conductive section, wherein the movable member is movable from an initial state, via a first state, to a second state, wherein in the initial state the first set of electrical contacts are conductively separated and the second set of electrical contacts are conductively separated, in the first state the first set of electrical contacts are conductively connected via the first conductive section and the second set of electrical contacts are conductively separated, and in the second state the second set of electrical contacts are conductively connected via the second conductive section; and
 a first impedance between one of electrical contacts of the first set of electrical contacts and one of the first terminal and the second terminal; and a second impedance between one of electrical contacts of the second set of electrical contacts and one of the first terminal and the second terminal, such that a reactance of the second impedance is significantly higher than a reactance of the first impedance.

2. The bypass switch according to claim 1, wherein the movable member is displaceable along a first direction to transition from the initial state, via the first state, to the second state.

3. The bypass switch according to claim 2, wherein the second conductive section is located, in the first direction, in front of the first conductive section.

4. The bypass switch according to claim 1, further comprising a pyrotechnic device which, when fired, produces a shock wave to move the movable member from the initial state, via the first state to the second state.

5. The bypass switch according to claim 1, further comprising a spring which, when released causes the movable member to move from the initial state, via the first state to the second state.

6. The bypass switch according to claim 1, wherein in the second state, the second conductive section is wedged between the second set of electrical contacts.

7. The bypass switch according to claim 1, wherein, during transition from the initial state via the first state to the second state, the movement of the movable member is sufficiently slow such that energy transferred between the first set of electrical contacts during the first state prevents arcing from either of the second set of electrical contacts when the second state is assumed.

8. The bypass switch according to claim 1, wherein the first conductive section is detachably connected to the second conductive section.

9. A power system comprising:
 an electrical device; and
 the bypass switch according to claim 1;
 wherein the first terminal and the second terminal of the bypass switch are connected across the electrical device.

10. A method for providing a conductive path between a first terminal and a second terminal, the method being performed in a bypass switch comprising a first set of electrical contacts respectively connected to the first terminal and the second terminal; a second set of electrical contacts respectively connected to the first terminal and the second terminal; a movable member comprising a first conductive section, a second conductive section and an insulator between the first conductive section and the second conductive section; a first impedance between one of electrical contacts of the first set of electrical contacts and one of the first terminal and the second terminal; and a second impedance between one of electrical contacts of the second set of electrical contacts and one of the first terminal and the second terminal, such that a reactance of the second impedance is significantly higher than a reactance of the first impedance, wherein the method comprises the steps of:

moving the moveable member is from an initial state to a first state wherein in the initial state the first set of electrical contacts are conductively separated and the second set of electrical contacts are conductively separated, and in the first state the first set of electrical contacts are conductively connected via the first conductive section and the second set of electrical contacts are conductively separated; and moving the moveable member from the first state to a second state, wherein in the second state the second set of electrical contacts are conductively connected via the second conductive section.

11. The method according to claim 10, further comprising the step of detecting a fault in an electrical device connected across the first terminal and the second terminal.

12. The method according to claim 10, wherein the steps of moving from the initial state to the first state and moving from the first state to the second state are performed as a result of a continuous movement of the moveable member.

13. The bypass switch according to claim 2, further comprising a pyrotechnic device which, when fired, produces a shock wave to move the movable member from the initial state, via the first state to the second state.

14. The bypass switch according to claim 3, further comprising a pyrotechnic device which, when fired, produces a shock wave to move the movable member from the initial state, via the first state to the second state.

15. The bypass switch according to claim 2, further comprising a spring which, when released causes the movable member to move from the initial state, via the first state to the second state.

16. The bypass switch according to claim 3, further comprising a spring which, when released causes the movable member to move from the initial state, via the first state to the second state.

17. The bypass switch according to claim 4, further comprising a spring which, when released causes the movable member to move from the initial state, via the first state to the second state.

18. The bypass switch according to claim 2, wherein in the second state, the second conductive section is wedged between the second set of electrical contacts.

19. The bypass switch according to claim 3, wherein in the second state, the second conductive section is wedged between the second set of electrical contacts.

20. The bypass switch according to claim 4, wherein in the second state, the second conductive section is wedged between the second set of electrical contacts.

* * * * *